3,344,129
PROCESS OF HYDROLYZING VINYL
ESTER-ETHYLENE COPOLYMERS
Herbert Bestian, Frankfurt am Main, and Helmut Korbanka, Hofheim, Taunus, Germany, assignors to Farbwerke Hoechst Aktiengesellschaft vormals Meister Lucius & Brüning, Frankfurt am Main, Germany, a corporation of Germany
No Drawing. Filed May 26, 1964, Ser. No. 370,346
Claims priority, application Germany, May 29, 1963,
F 39,867
5 Claims. (Cl. 260—87.3)

German Patent 847,502 teaches the hydrolysis (saponification of ester groups) of copolymers of ethylene and vinyl esters of organic monocarboxylic acids, in which the molar proportion of vinyl ester to ethylene is greater than 1:5. In the case of vinyl acetate/ethylene coplyomers the content of vinyl acetate is at least 40% by weight. In the aforesaid patent it has been stated that copolymers in which the molar proportion of vinyl ester to ethylene is below 1:5 are unsuitable for being hydrolyzed.

The difficulties to hydrolyze vinyl ester/ethylene copolymers with small vinyl ester contents are due, on the one hand, to the poor solubility of the said products in the low boiling alcohols commonly used and, on the other, to their slowness in reaction. Ethylene/vinyl acetate copolymers having a low content of vinyl acetate of less than 40% by weight, for example, are insoluble or sparingly soluble in low boiling alcohols, such as methanol or ethanol. Experiments to subject such products to an ester interchange reaction in a manner similar to that used for polymeric vinyl esters yield in the most favorable case products which have incompletely been hydrolyzed. Besides hydrolyzed molecules they contain partially hydrolyzed molecules and molecules that have not been hydrolyzed. The composition of the hydrolysis products produced in this manner is very non-uniform. This non-uniformity is due to the insufficient solubility and the complicated hydrolysis in heterogeneous phase.

The concomitant use of dissolving intermediaries, for example aromatic hydrocarbons, in the hydrolysis, as disclosed in U.S. Patent 2,386,347, is only successful with copolymers in which the molar proportion of vinyl ester to ethylene is greater than 1:5. In the case of copolymers having a low vinyl ester content the required amount of dissolving intermediary is very high. Apart from the fact that such a proceeding is uneconomical, the reaction velocity becomes so slow that the reaction practically comes to a standstill. Moreover, the processing of solvent mixtures of this type consisting of low boiling alcohols and, for example, aromatic hydrocarbons, is very complicated and expensive.

The present invention provides a process for preparing practically completely or partially hydrolyzed copolymers of vinyl acetate and ethylene which comprises subjecting to an ester interchange reaction copolymers of vinyl acetate and ethylene in which the molar proportion of vinyl acetate to ethylene is below 1:5 in the presence of catalytic amounts of acids or alkalies with a primary, preferably aliphatic alcohol with at least 4 carbon atoms, advantageously 4 to 8 carbon atoms.

The low molecular weight esters formed, mainly of acetic acid, with the primary alcohol used is removed from the reaction mixture by distillation together with the excess alcohol.

The use of high boiling primary alcohols with at least 4 carbon atoms offers the considerable advantage that copolymers in which the molar proportion of vinyl acetate to ethylene is smaller than 1:5 are well soluble in these alcohols in the heat. When operating in this manner the reaction can be carried out in homogeneous phase without the use of dissolving intermediaries. It is suitable to choose the alcohol in accordance with the solubility of the copolymer to be subjected to an ester interchange reaction. Copolymers with a molar proportion of vinyl acetate to ethylene in the range of from 1:20 to 1:5 are preferably reacted with n-butanol.

With copolymers with a molar proportion below 1:20 it is of advantage to use a higher alcohol, for example hexanol or octanol. To use still higher alcohols having more than 8 carbon atoms is neither necessary nor expedient. 2-ethylhexanol, for example, dissolves in the heat not only copolymers having a very low content of vinyl acetate but also a pure ethylene polymer.

The primary alcohols to be used in the process of the invention serve as solvent and simultaneously as ester interchange agent. It is advantageous to use monohydric alcohols. Straight-chain as well as branched primary alcohols give the same results, for example n-butanol, isobutanol, amyl alcohols, n-hexanol, 2-ethylbutanol, 4-methylpentanol, n-heptanol, n-octanol, 2-ethylhexanol and also mixtures of alcohols as obtained, for example, by oxo-synthesis.

The ester interchange reaction is carried out in the presence of a known acid or alkaline catalyst which shall be quantitatively soluble in the reaction mixture. Suitable catalysts are, for example, sulfuric acid, phosphoric acid, toluene-sulfonic acid, sodium hydroxide and potassium hydroxide as well as alkali metal alcoholates. These compounds are used in catalytic amounts of 0.01 to 10% by weight, preferably 0.1 to 1% by weight, calculated on the amount of copolymer used.

The reaction temperature may vary within wide limits. The reaction is suitably carried out at the boiling temperature of the alcohol used at atmospheric pressure. It shall be above 100° C. and advantageously in the range of from 100 to 200° C., because at lower temperatures the velocity of the ester interchange reaction is too slow. When alcohols having a high boiling point are used the ester interchange may be carried out under reduced pressure. It is likewise possible to operate at superatmospheric pressure.

The ester interchange reaction can be carried out either discontinuously or continuously. When operating in discontinuous manner it is advantageous to add the catalyst to the solution of the copolymer to be reacted in the primary alcohol and to boil the reaction mixture in a vessel provided with distilling column. A mixture distills over consisting of the alcohol used and the ester formed. The progress of the ester interchange can be controlled by analysis of the distillate, for example by determination of the ester number. It is possible to interrupt the reaction when a certain degree of ester interchange is reached. In this way partially hydrolyzed copolymers are obtained. It is thus possible to produce copolymers having any desired degree of hyrolysis. The partially hydrolyzed products are copolymers of ethylene, vinyl acetate and vinyl alcohol, whereas the completely hydrolyzed products are copolymers of ethylene and vinyl alcohol.

When the ester interchange is terminated a solution of the reaction product in the excess alcohol is obtained. The reaction product can be isolated in various ways. In the most simple case the alcohol is distilled off after the catalyst has been rendered ineffective, for example by neutralization. The polymer melt obtained can be freed from the last residues of the solvent under reduced pressure. Alternatively, the alcohol can be removed by distillation with steam. Still further, the reaction product can be precipitated from the fairly concentrated solution by means of a non-solvent. Especially suitable for this purpose are low boiling alcohols, preferably methanol.

The latter mode of operation offers a considerable advantage over the former. Copolymers of ethylene and vinyl esters always contain smaller or greater amounts of ethylene groups grafted on to the carboxylic acid radical of the vinyl ester. Such extended carboxylic acid radicals yield high molecular weight esters in the ester interchange reaction which do not distill over and remain in the reaction product. These high molecular weight esters are substantially soluble in methanol. When the reaction product is precipitated with methanol the high molecular weight esters remain in the filtrate and hydrolysis products are obtained which are free from the said esters.

The starting products for the hydrolysis are produced by copolymerizing ethylene with vinyl acetate under pressure at elevated temperature in the presence of a free radical liberating catalyst, for example a peroxy compound. Processes for preparing ethylene/vinyl acetate copolymers have been described, for example, in German Patent 912,267, U.S. Patent 2,396,785 and British Patent 569,927.

The hydrolysis products obtained by the process of the invention are insoluble in water and almost all organic solvents in the cold. They are soluble in the heat in aromatic hydrocarbons, chlorohydrocarbons, high molecular weight alcohols, esters, ketones, cyclic ethers, pyridine and dimethyl formamide. The solubility depends on the degree of hydrolysis and the monomer proportion in the starting product.

Fully hydrolyzed products are sparingly soluble, crystalline, hard and brittle. With a low content of vinyl alcohol they represent modified polyethylenes which have a higher stiffness and hardness, a better dyeability and a better adhesiveness on metal surfaces than pure polyethylene. The partially hydrolyzed products are flexible and are distinguished by a high surface gloss. Completely hydrolyzed copolymers have a higher softening point than the corresponding polyethylenes, as ascertained by determination of the flow point/drop point. In any case the flow point/drop point is above 100° C. Moreover, they have better mechanical properties than the corresponding polyethylenes. With a high tensile strength of more than 100 kg./cm.$^2$ they have a considerably improved tensile impact strength which may reach or even exceed ten times the value of a comparable polyethylene.

The products obtained by the process of the invention can be used as modified polyethylenes with improved properties in the field of plastics and waxes. Still further, they can be used as intermediate products for further reactions, for example they can be cross-linked with diisocyanate.

The following examples serve to illustrate the invention but they are not intended to limit it thereto.

*Example 1*

200 grams of a vinyl acetate/ethylene copolymer with a molar proportion of vinyl acetate to ethylene of 1:5.25 (about 37% by weight of vinyl acetate) were dissolved in 800 grams of n-butanol. 2 grams of concentrated sulfuric acid were added to the solution and the reaction mixture was boiled for 2 hours with reflux. By means of a column with about 60 theoretical separating stages 600 grams of the mixture were distilled off with a ratio of reflux of 15 to 1. The distillate contained 11.5% by weight of butyl acetate. The reaction product was cooled to 35° C. while stirring and precipitated with 1 liter of methanol. It separated at said temperature in granular and well filterable form. After having separated and dried 123 grams of a white and completely hydrolyzed product were obtained.

*Example 2*

100 grams of a vinyl acetate/ethylene copolymer with a molar proportion of vinyl acetate to ethylene of 1:41 (about 7% by weight of vinyl acetate) were dissolved in 400 grams of 2-ethylhexanol. 1 gram of sodium hydroxide was added as catalyst. 350 grams of the reaction mixture were distilled off with the aid of a short column. After cooling 0.5 l. of methanol was added to the distillation residue. The separating product was filtered off with suction and dried. 65 grams of a white powder were obtained which was completely hydrolyzed as ascertained by determination of the hydroxyl number.

*Example 3*

2 grams of concentrated sulfuric acid were added to a solution of 200 grams of a vinyl acetate/ethylene copolymer (molar proportion 1:12.3, vinyl acetate content 20% by weight) in 800 grams of n-butanol. After having boiled the reaction mixture for two hours with reflux 281 grams were distilled off over a column. The distillate had an ester number of 47.5. The distillation residue was precipitated with methanol and repeatedly washed with cold methanol. The filtrate and the wash methanol were combined. 2320 grams of a liquid were obtained having an ester number of 6.8. After evaporation of the liquid a residue of 18 grams remained behind.

51% of the precipitated reaction product had been hydrolyzed as resulted from the hydroxyl number. 157 grams of a white powder were obtained.

*Example 4*

(a) (Comparative example) 200 grams of a copolymer containing about 30% by weight of vinyl acetate and having a molar proportion of vinyl acetate to ethylene of 1:7.2 were dissolved in 600 grams of 2-ethylhexanol and 2 grams of KOH were added. The reaction mixture was boiled for 24 hours with reflux. The reaction product was then precipitated with cold methanol. The product freed from solvent residues had a hydroxyl number of 8.5 milligrams KOH per gram, corresponding to a degree of hydrolysis of about 4.4% by weight.

(b) (Example according to the invention) The reaction was carried out as described sub (a) with the exception that 420 grams of the reaction mixture were distilled off. After precipitation with methanol a product was obtained having a hydroxyl number of 189 milligrams KOH per gram, corresponding to a degree of hydrolysis of 96.5%.

Examples 4a and 4b show that the hydrolysis only progresses when the low molecular weight ester formed is continuously removed from the reaction mixture.

*Example 5*

2000 grams of a vinyl acetate/ethylene copolymer with a molar proportion of vinyl acetate to ethylene of 1:5.25 (about 37% by weight of vinyl acetate) were dissolved in 6 kilograms of n-butanol. 15 grams of potassium hydroxide were added as ester interchange catalyst. The mixture was boiled for 4 hours with reflux. 3000 grams of distillate were then separated by means of an effective column. 4 kilograms of n-butanol were again added to the reaction mixture and a further 3.2 kilograms of distillate were separated. The combined distillates (7.2 kilograms) contained 1000 grams of butyl acetate, ascertained by determination of the ester number.

After precipitation of the reaction product with methanol and drying 1280 grams of a white powder were obtained which was completely hydrolyzed. It had a reduced viscosity of 0.4, determined with a 2% solution of the product in n-butanol at 85° C., a hardness of $1.5 \times 10^{-1}$ measured as penetration number according to DIN Specification 51 579, a tensile strength of 123 kg./cm.$^2$ an elongation at break of 310%, a tensile impact strength of 480 kg./cm.$^2$ and a flow point/drop point of 114/119° C.

We claim:

1. A process for preparing at least partially hydrolyzed copolymers of vinyl acetate and ethylene which comprises heating a coplymer of vinyl acetate and ethylene having a molecular proportion of vinyl acetate to ethylene of lower than 1:5, in the presence of 0.01–10 percent by weight, calculated on the copolymer, of a member selected from the group consisting of a compound having an acid reaction and a compound having an alkaline reaction in aqueous solution with a primary alcohol having 4–10 carbon atoms and simultaneously distilling off the formed ester of the primary alcohol from the reaction mixture.

2. A process for preparing at least partially hydrolyzed copolymers of vinyl acetate and ethylene which comprises heating a copolymer of vinyl acetate and ethylene having a molecular proportion of vinyl acetate to ethylene of lower than 1:5 to a temperature in the range of 100–200° C. in the presence of 0.01–10 percent by weight, calculated on the copolymer, of a member selected from the group consisting of a compound having an acid reaction and a compound having an alkaline reaction in aqueous solution with a primary alcohol having 4–10 carbon atoms and simultaneously distilling off the formed ester of the primary alcohol from the reaction mixture.

3. A process for preparing at least particularly hydrolyzed copolymers of vinyl acetate and ethylene which comprises heating a copolymer of vinyl acetate and ethylene having a molecular proportion of vinyl acetate to ethylene of lower than 1:5 in the presence of 0.1–1 percent by weight, calculated on the copolymer, of a member selected from the group consisting of a compound having an acid reaction and a compound having an alkaline reaction in aqueous solution with a primary alcohol having 4–10 carbon atoms and simultaneously distilling off the formed ester of the primary alcohol from the reaction mixture.

4. A process for preparing at least partially hydrolyzed copolymers of vinyl acetate and ethylene which comprises heating a copolymer of vinyl acetate and ethylene having a molecular proportion of vinyl acetate to ethylene of 1:20 to 1:5 in the presence of 0.01 to 10 percent by weight, calculated on the copolymer, of a member selected from the group consisting of a compound having an acid reaction and a compound having an alkaline reaction in aqueous solution with butanol and simultaneously distilling off the formed ester of butanol from the reaction mixture.

5. A process for preparing at least partially hydrolyzed copolymers of vinyl acetate and ethylene which comprises heating a copolymer of vinyl acetate and ethylene having a molecular proportion of vinyl acetate to ethylene of lower than 1:20 in the presence of 0.01 to 10 percent by weight, calculated on the copolymer, of a member selected from the group consisting of a compound having an acid reaction and a compound having an alkaline reaction in aqueous solution with a primary alcohol selected from the group consisting of hexanol and 2-ethylhexanol and simultaneously distilling off the formed ester of said alcohol from the reaction mixture.

References Cited
UNITED STATES PATENTS

| | | | |
|---|---|---|---|
| 2,399,653 | 5/1946 | Roland | 260—57.3 |
| 2,403,464 | 7/1946 | Smith | 260—87.3 |
| 2,421,971 | 6/1947 | Sperati | 260—87.3 |
| 2,467,774 | 4/1949 | Plambeck | 260—87.3 |
| 3,159,608 | 12/1964 | Senyckijj | 260—81.3 |

JOSEPH L. SCHOFER, *Primary Examiner.*

M. B. KURTZMAN, *Assistant Examiner.*